United States Patent
Landau et al.

(10) Patent No.: US 10,043,130 B2
(45) Date of Patent: Aug. 7, 2018

(54) METHOD AND APPARATUS FOR ASCERTAINING AT LEAST ONE EXIT PROBABILITY FROM A LAND AREA IDENTIFIABLE IN A DIGITAL MAP AS OPEN TERRAIN

(75) Inventors: Andreas Landau, Aschaffenburg (DE); Caroline Ussat, Hameln (DE)

(73) Assignee: Robert Bosch GNBH, Stuttgart (DE)

( * ) Notice: Subject to any disclaimer, the term of this patent is extended or adjusted under 35 U.S.C. 154(b) by 758 days.

(21) Appl. No.: 13/876,745

(22) PCT Filed: Jul. 29, 2011

(86) PCT No.: PCT/EP2011/063067
§ 371 (c)(1),
(2), (4) Date: Jun. 7, 2013

(87) PCT Pub. No.: WO2012/041566
PCT Pub. Date: Apr. 5, 2012

(65) Prior Publication Data
US 2013/0254147 A1    Sep. 26, 2013

(30) Foreign Application Priority Data
Sep. 28, 2010   (DE) .......................... 10 2010 041 513

(51) Int. Cl.
*G06F 15/18*     (2006.01)
*G06N 5/04*      (2006.01)
*G01C 21/26*     (2006.01)

(52) U.S. Cl.
CPC ............... *G06N 5/04* (2013.01); *G01C 21/26* (2013.01)

(58) Field of Classification Search
CPC .................................. G06N 5/04; G01C 21/26
(Continued)

(56) References Cited

U.S. PATENT DOCUMENTS 8,060,271 B2 *   11/2011   Dolgov et al. ................... 701/28
2009/0032755 A1   2/2009   Pritchard
(Continued)

FOREIGN PATENT DOCUMENTS

CN    1653505 A    8/2005
DE    101 46 115   4/2003
(Continued)

OTHER PUBLICATIONS

A Non-Gaussian Filter for Tracking Targets Moving Over Terrain, by Reid, published 1978.*
(Continued)

*Primary Examiner* — David R Vincent
(74) *Attorney, Agent, or Firm* — Norton Rose Fulbright US LLP; Gerard Messina

(57) ABSTRACT

A method and an apparatus for carrying out the method, for ascertaining at least one exit probability from a land area identifiable in a digital map as open terrain, wherein the exit probability is ascertained starting from a position within the land area. The method includes a step of subdividing the land area into a plurality of cells, with an initial transition probability being assigned to at least one transition from one cell to an adjacent cell. The method further includes a step of adapting the initial transition probability of the transition in response to a presence of at least one item of information from the digital map, to obtain an adapted transition probability for the transition, the item of information being associated with the cell or with the adjacent cell. The method also includes ascertaining the exit probability at least using the adapted transition probability of the transition.

10 Claims, 5 Drawing Sheets

(58) Field of Classification Search
USPC .............................................. 706/15, 45, 12
See application file for complete search history.

(56) References Cited

U.S. PATENT DOCUMENTS

| | | |
|---|---|---|
| 2009/0101464 A1 | 4/2009 | Doebele et al. |
| 2010/0101913 A1 | 4/2010 | Schuler et al. |
| 2010/0133058 A1 | 6/2010 | Doerr |

FOREIGN PATENT DOCUMENTS

| | | |
|---|---|---|
| DE | 10 2007 003 902 | 7/2008 |
| JP | 0935183 A | 2/1997 |
| JP | 2006-349000 | 12/2006 |

OTHER PUBLICATIONS

Traversability Analysis for Unmanned Ground Vehicles, by Collier et al., published 2006.*

International Search Report, PCT International Application No. PCT/EP2011/063067, dated Oct. 28, 2011.

Nougues et al., "We Know Where You Are Going: Tracking Objects in Terrain," *IMA Journal of Mathematics Applied in Business and Industry*, vol. 8, No. 1, pp. 39-58 (Jan. 1997).

Reid et al., "A Non-Gaussian Filter for Tracking Targets Moving Over Terrain," *Twelth Asilomar Conference on Circuits, Systems, and Computers*, pp. 112-116 (Nov. 1978).

* cited by examiner

METHOD AND APPARATUS FOR ASCERTAINING AT LEAST ONE EXIT PROBABILITY FROM A LAND AREA IDENTIFIABLE IN A DIGITAL MAP AS OPEN TERRAIN

FIELD

The present invention relates to method for ascertaining at least one exit probability from a land area identifiable in a digital map as open terrain, to an apparatus for ascertaining at least one exit probability from a land area identifiable in a digital map as open terrain, and to a computer program product.

BACKGROUND INFORMATION

Conventional road-based navigation systems determine a suggested route based on a stored information base. The information base is usually a digital map containing passable roads. The suggested route may be communicated to a driver of the vehicle as a driving recommendation via a communications system. In those navigation systems, by way of a positioning of the vehicle a comparison is made between an ascertained position and the suggested route, and the driving recommendation is determined with reference to an area surrounding the vehicle and, in advance, with reference to the suggested route. Since the positioning system does not output an absolute position but merely outputs a position probability, it is necessary to extend the roads in the digital map by a tolerance range on both sides. If the position found lies within the tolerance range, it is assumed that the vehicle is on a road. This procedure, referred to as a matching procedure, outputs the current position of the vehicle as deviating from a road only when the tolerance range is exceeded. In that case, the method is unable to associate a road or its surrounding tolerance range with the current position and it defines the current position as off-road or open terrain. If the vehicle physically reaches and drives along a road when coming from an off-road area, the method requires a period of time for the matching procedure before the position of the vehicle on the road is recognized and before a situation-adapted driving recommendation may once again be output for the driver.

German Patent No. DE 101 46 115 B4 describes a method with which destination guidance to a final destination is carried out with the aid of directional navigation when a position of a vehicle is identified as being outside a known road network and no alternative known road is available for destination guidance.

SUMMARY

In accordance with the present invention, an example method is provided for ascertaining at least one exit probability from a land area identifiable in a digital map as open terrain, and an example apparatus is provided for ascertaining at least one exit probability from a land area identifiable in a digital map as open terrain, and finally a corresponding example computer program product is provided.

In accordance with the present invention, a time delay in a route guidance system after a known road is reached from open terrain may be avoided if an exit probability of a vehicle from the open terrain may be determined beforehand from a current position. In that manner, the route guidance may be already prepared if a probable exit point from the open terrain on a road bordering on the open terrain is ascertained. In order to obtain a higher prediction probability, attributes from a digital map that make arrival or travel there more probable or less probable may be assigned to the open terrain and boundaries of the open terrain. On the basis of those attributes it is possible to determine in advance, with reference to a current position of the vehicle in the open terrain, a probability of arriving at one or more points on the boundaries of the open terrain. In addition, further factors may be taken into consideration for a determination, such as a current orientation of the vehicle or a current speed of the vehicle.

By using a method in accordance with the approach presented herein it is advantageously possible to ascertain a route more quickly before a vehicle leaves an area identifiable as open terrain. As a result, driving and steering recommendations may also be implemented by a driver more quickly and a planned destination may be reached more quickly. By avoiding misdirection following departure from the open terrain it is possible to minimize the distance traveled and to avoid unnecessary energy consumption.

The present invention provides a method for ascertaining at least one exit probability from a land area identifiable in a digital map as open terrain, starting from a position within the land area, the method including the following steps:

a step of subdividing the land area into a plurality of cells, with an initial transition probability being assigned to at least one transition from one cell to an adjacent cell, the transition being situated between the position and an edge of the land area;

a step of adapting the initial transition probability of the transition, in response to a presence of at least one item of information from the digital map, the item of information being associated with the cell or with the adjacent cell, in order to obtain an adapted transition probability for the transition; and a step of ascertaining the exit probability, the exit probability being ascertained at least with the use of the adapted transition probability of the transition.

The present invention further provides an apparatus for ascertaining at least one exit probability from a land area identifiable in a digital map as open terrain, starting from a position within the land area, the apparatus having the following features:

a device for subdividing the land area into a plurality of cells, the device for subdividing being configured to assign an initial transition probability to at least one transition from one cell to an adjacent cell, the transition being situated between the position and an edge of the land area;

a device for adapting the initial transition probability of the transition, in response to a presence of at least one item of information from the digital map, the item of information being associated with the cell or with the adjacent cell, in order to obtain an adapted transition probability for the transition; and a device for ascertaining the exit probability, the device for ascertaining being configured to ascertain the exit probability at least with the use of the adapted transition probability of the transition.

A digital map may be a representation of acquired data with spatial referencing. The acquired data may represent spatial phenomena. For example, spatial phenomena may be traffic routes, stretches of land, bodies of water, or vegetation. The spatial phenomena may be stored in the digital map in generalized and digitized form. Sections of land without traffic routes may be marked in the digital map as open terrain or off-road area. The open terrain may have terrain characteristics. A land area identifiable as open terrain may be bounded by spatial phenomena, such as traffic routes, residential areas or bodies of water. The land area may be subdivided. The subdivision may be made by randomly or systematically placed boundaries. The boundaries may subdivide the land area into cells. The cells may be in a regular or irregular arrangement. The cells may have any two-dimensional shape, such as, for example, a triangular, rectangular, pentagonal or hexagonal etc. shape. Two adjacent cells may have a transition at a common boundary. Two cells having a single point of contact may have a transition, for example at a junction point of a plurality of boundaries. The transition may be allocated an initial transition probability from the first cell to the second cell. In the first cell, all initial transition probabilities to adjacent cells may be added together to give a total transition probability value, for example the value one. The initial transition probabilities may be identical. The initial transition probability may be adapted by carrying out the steps of the method. In the step of adapting, a value of the initial transition probability may be altered, that is, the value of the initial transition probability may be increased or reduced. The adapting results in an adapted transition probability. The increasing or reducing of the value may represent a higher or lower probability of leaving or reaching the associated cell. The probability may be affected by spatial phenomena in the cell or the adjacent cell. The spatial phenomena may be represented by an item of information from the digital map. For example, it may be improbable to reach with a vehicle a terrain that is poorly negotiable by the vehicle. The probability of reaching an impassable terrain may then tend toward zero. Accordingly, it may be more probable to reach or drive across terrain that is easily negotiable by the vehicle, and at the same time it may be less probable to leave a terrain that is easily negotiable. Using the adapted transition probabilities, and, if no adaptation is possible, the initial transition probabilities, it is possible to ascertain an exit probability for a cell at the edge of the open terrain/the off-road area. For that purpose, the transition probabilities of the transitions between a position within the land area and the cell at the edge may be combined in accordance with a processing rule. The processing rule may, for example, be a Markov chain, each element of the chain being able to represent one cell, and the Markov probabilities between the elements of the chain being able to represent the transition probabilities of the transitions.

The present invention further provides an apparatus or a navigation device configured to carry out or implement the steps of the method according to the present invention. In particular, the apparatus or the navigation apparatus may have devices that are configured to carry out one step of the method each. An object underlying the present invention may be attained quickly and efficiently also by this implementation variant of the present invention in the form of a control device.

An apparatus or a navigation device may be understood herein as being an electrical device that processes sensor signals and outputs navigation signals in dependence thereon. The navigation device may have an interface that may be in the form of hardware and/or software. When in the form of hardware, the interfaces may, for example, be part of a so-called system ASIC encompassing a wide variety of functions of the navigation device. It is also possible, however, for the interfaces to be dedicated, integrated control circuits or to consist at least partially of discrete components. When in the form of software, the interfaces may be software modules present on a microcontroller, for example, in addition to other software modules.

Also advantageous is a computer program product with program code which is stored on a machine-readable medium such as a semiconductor memory, a hard disk memory or an optical memory and which is used to carry out the method in accordance with one of the above-described embodiments when the program is executed on an apparatus or a navigation device.

In accordance with a further embodiment of the present invention, in the step of subdividing, a plurality of transitions may form a network, the network encompassing the land area, and/or the cells being restricted to a previously determined maximum surface area of the land area. The network may cover the land area completely and without interruption. If a size of the land area exceeds a predefined size, the land area may be limited to the predefined size by one or more auxiliary boundaries. For example, the predefined size may be a square kilometer. That makes it possible to limit the processing time for carrying out the steps of the method and to carry out the steps of the method quickly.

In a further embodiment of the present invention, in the step of adapting, the initial transition probability may be adapted with the use of a class of a traffic route when the cell includes at least the traffic route and when the digital map contains items of information about the traffic route and the class, and/or the initial transition probability may be adapted with the use of at least one terrain characteristic of the cell or the adjacent cell when the digital map contains items of information about the terrain characteristic. The class of a traffic route may represent particular items of information relating to a probability of reaching and/or leaving the traffic route. For example, a transition probability from an adjoining cell into a cell with a low-class road, such as a track or a municipal road, may be higher than the transition probability into a cell with a road of a higher class, such as a freeway. The transition probability into a cell with a road of the highest class, such as an expressway, may tend toward zero. An expressway may generally be reached only through expressway entry ramps, that is, by way of connecting, lower-class roads. Accordingly, it is advantageous if the ascertained exit probability to a cell having a road of a very high class, for example an expressway, is very small or zero. A terrain characteristic may also affect the negotiability of a cell. For example, a transition probability from a cell with a low inclination of the terrain to a cell with no inclination of the terrain may be higher than a transition probability from a cell with a low inclination of the terrain to a cell with a great inclination of the terrain. Cells that are impassable for a vehicle, such as cliffs, steep escarpments, areas of water or dense forest and also buildings may have a transition probability to those cells which may tend toward zero. If the land area is bounded by impassable cells, it is advantageous if the exit probability there is as low as possible. In that manner, incorrect calculation of suggested routes may be avoided and only promising exit points from the open terrain may be taken into consideration for an advance calculation.

In accordance with a further embodiment of the present invention, in the step of adapting, the initial transition probability may be adapted with the use of an instantaneous direction of movement and/or an instantaneous speed of a vehicle in which the method is carried out. It is thus possible to take an instantaneous driving condition into consideration when ascertaining the exit probability. For example, it may be improbable that the vehicle will make extreme changes in direction and/or speed. The instantaneous vehicle speed may affect an ability of the vehicle to take corners. For example, a vehicle is able to take tighter corners at walking speed than at maximum speed. Accordingly, transitions in the direction of travel or transitions that may be reached with moderate degrees of steering lock may have a higher transition probability than do, for example, transitions beside the vehicle or counter to the instantaneous direction of travel.

In addition, in accordance with a further embodiment, in the step of adapting, the initial transition probability may be adapted with the use of a distance of the transition from an entry point of the vehicle into the open terrain. For example, a parking lot or a driveway into private land may not be recorded in the map and thus may be stored in the map as open terrain. The vehicle may then be expected to leave the open terrain again at the same place. If, however, the vehicle moves very far away from the entry point, then it may be more probable that the vehicle will leave the off-road area/open terrain at a different place.

In a further embodiment, in the step of subdividing, a further initial transition probability may be assigned to at least one further transition from the cell into a further adjacent cell, the further transition being situated between the position and an edge of the land area. In the step of adapting the further initial transition probability of the further transition, the further initial transition probability may be adapted in response to a presence of at least one further item of information from the digital map in order to obtain a further adapted transition probability for the further transition, the further item of information being associated with the cell or with the further adjacent cell. In the step of ascertaining, a further exit probability may be ascertained, the further exit probability being ascertained at least with the use of the further adapted transition probability of the further transition. The transition may be situated between a first and a second cell. The further transition may be situated between the first cell and a third cell. Transitions are situated between cells that may be reached directly from one another. The third cell may be directly adjacent to the first cell. The second and third cells are not necessarily directly adjacent, but may be. The further initial transition probability may be assigned to the further transition.

The further initial transition probability may be referred to as a second initial transition probability. The adapting of the further initial transition probability may take place according to an item of information from the digital map relating to the first and/or third cell. The further adapted transition probability may be referred to as the second adapted transition probability and may characterize the transition between the first and the third cell. The exit probability may be a first exit probability. The further exit probability may be a second exit probability. The first and the second exit probability may relate to different cells; however, both probabilities may relate to the same cell but with the use of different transition probabilities. For the determination of the first exit probability the first transition probability may be used, for the determination of the second exit probability the second transition probability may be used. Such an embodiment of the present invention offers the advantage that it is then possible to determine a most probable point of exit from the land area, for which the crossover probabilities of different transitions are used. This increases the prediction accuracy.

In addition, in the step of ascertaining, an exit path from the land area may also be ascertained, the exit path containing the transition when the exit probability is higher than the further exit probability. The exit path ascertained may be that exit path which has the higher exit probability. In that manner, the driving recommendation for the driver may be made in advance at the more probable point of exit from the open terrain and hence may be available more quickly.

In an additional embodiment of the present invention, in the step of subdividing, a subsequent initial transition probability may be assigned to at least one subsequent transition from the adjacent cell into an adjacent subsequent cell, the subsequent transition being situated between the position and an edge of the land area. In the step of adapting, the subsequent initial transition probability of the subsequent transition may be adapted in response to a presence of at least one subsequent item of information from the digital map, the subsequent item of information being associated with the adjacent cell or with the subsequent cell, in order to obtain an adapted subsequent transition probability for the subsequent transition. In addition, in the step of ascertaining, the exit probability may be ascertained with the use of the adapted subsequent transition probability of the subsequent transition. The subsequent cell may be a fourth cell. The subsequent initial transition probability may be a third initial transition probability. The subsequent item of information may be associated with the second or the fourth cell. The adapted subsequent transition probability may be a third adapted transition probability. The exit probability may be determined with the use of the first and third adapted transition probability. Such an embodiment of the present invention offers the advantage that a sequence of transitions may then be used to determine the exit probability. This makes it possible to take into consideration objects or spatial phenomena contained in cells that are further away from the cell originally considered. In that manner, the probability of predicting the place at which the open terrain will be left again is further increased.

BRIEF DESCRIPTION OF THE DRAWINGS

The present invention is described in detail by way of example with reference to the figures.

DETAILED DESCRIPTION OF EXAMPLE EMBODIMENTS

Figure 1:
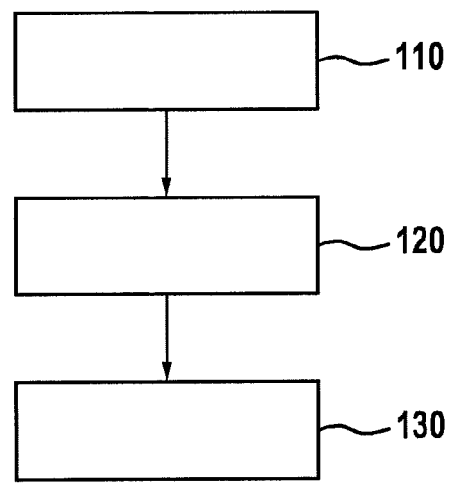
FIG. 1 shows a flow diagram of a first exemplary embodiment of the present invention.

Identical or similar elements may be provided in the Figures by identical or similar reference numerals, and repetition of a description thereof will be dispensed with. Furthermore, the Figures and the description thereof contain numerous features in combination. It will be clear to one skilled in the art that those features may also be considered individually or that they may be combined to form further combinations that are not explicitly described herein. In addition, in the description which follows, the present invention may possibly be explained using different quantities and dimensions, but the present invention is not to be understood as being limited to those quantities and dimensions. Furthermore, method steps according to the present invention may be repeated and may be carried out in an order other than the order described. Where an exemplary embodiment contains an "and/or" conjunction between a first feature/step and a second feature/step, this may be taken as meaning that the exemplary embodiment has, in accordance with one form of embodiment, both the first feature/step and the second feature/step and, in accordance with a further form of embodiment, either only the first feature/step or only the second feature/step.

FIG. 1 shows as a first exemplary embodiment of the present invention a flow diagram of a modeling of the movements in an off-road area for predicting the future movements with the aid of a Markov process. A method for ascertaining at least one exit probability from a land area identifiable in a digital map as open terrain has a step 110 of subdividing, a step 120 of adapting, and a step 130 of ascertaining. In step 110 of subdividing, the land area is subdivided into a plurality of cells. An initial transition probability is assigned to at least one transition from one cell to an adjacent cell. The transition is situated between a position within the land area and the edge of the land area. In step 120 of adapting, the initial transition probability of the transition is adapted in order to obtain an adapted transition probability. The adapting is carried out in response to a presence of at least one item of information from the digital map. The item of information is associated with the cell and/or with the adjacent cell. In step 130 of ascertaining, an exit probability is ascertained with the use of the adapted transition probability of the transition.

Using the method presented herein, it is possible to determine the probabilities of exiting from an off-road area, which a driver has entered with his vehicle, at a point on the digital road map. Of those points, that point with the highest probability is thereby ascertained. For that purpose, a grid is placed over the off-road area in which the driver is situated with his vehicle. The fields of the grid serve as states for a Markov process. With the aid of the topography of the land area, the current position and orientation of the vehicle, the model of the vehicle for physically correct modeling of movement, and the characteristics of the roads bounding the off-road area, probabilities are calculated for the change from one state to the other. Optionally, the probabilities for the entry area may also be adapted. Thus, it is possible to calculate the probability of reaching one of the outer states, and hence a road, from the current position. In that manner, the navigation system is able to orient itself, and where applicable guide the driver, more quickly upon re-entry into the road network. The probabilities so ascertained are updated, for example, at a change in position, especially at every change in position. In addition, the method always offers a solution, even when the existing data do not provide all the necessary information. The method presented herein makes a more rapid orientation possible upon re-entry into the road network from an off-road area.

Figure 2:
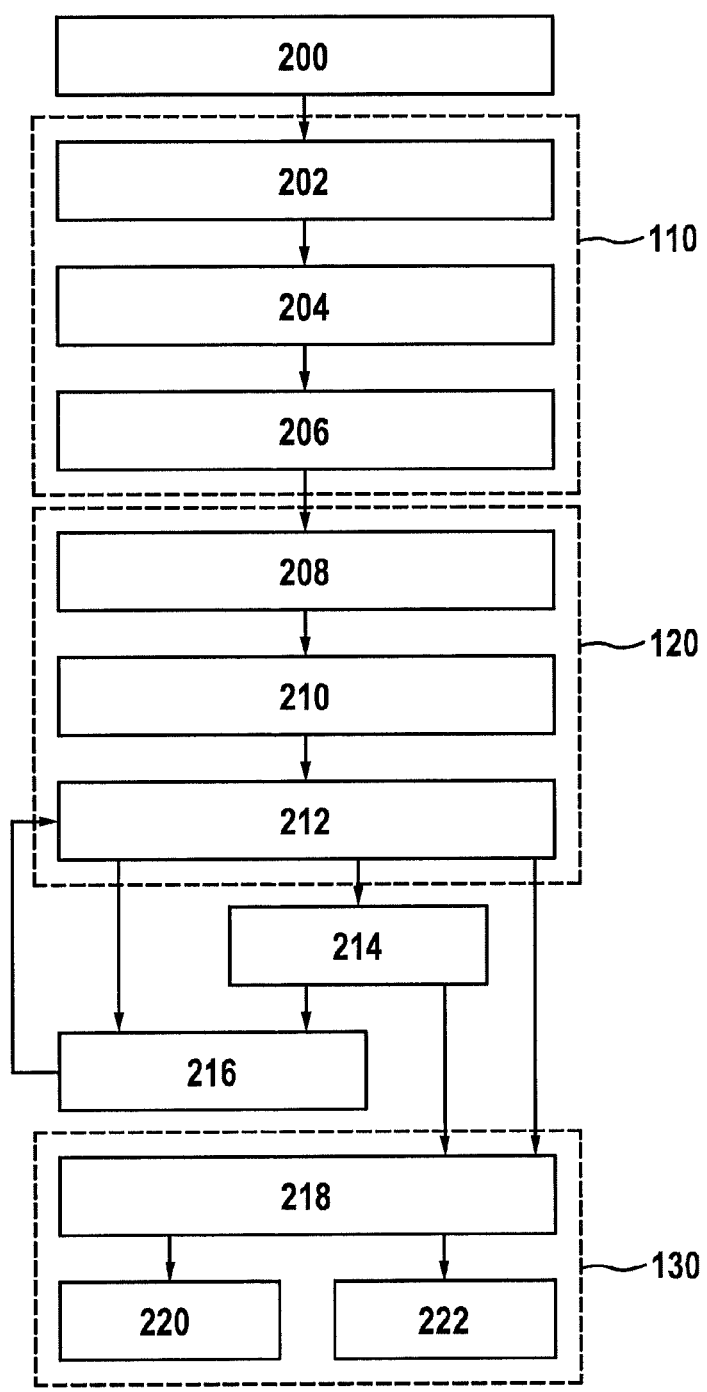
FIG. 2 shows a flow diagram of a second exemplary embodiment of the present invention.

FIG. 2 shows a flow diagram of a further exemplary embodiment of the present invention. The method for ascertaining at least one exit probability from a land area identifiable in a digital map as open terrain is initialized in a step 200. In that step, the position of the vehicle is marked as being in open terrain, or as "off-road".

Step 110 of subdividing the land area is organized into a plurality of sub-steps. In a sub-step 202 of identifying the boundaries, the boundaries of the off-road area are identified. In a sub-step 204 of covering the area with a grid, the land area is covered with a grid. In a sub-step 206 of determining the starting transition probabilities, the initial transition probabilities are determined. Step 120 of the adapting is also subdivided into a plurality of sub-steps. In a sub-step 208 for improving the probabilities, the starting probabilities are adapted by taking into consideration the characteristics of the roads restricting the land area. In a sub-step 210 of the improvement by taking into consideration the characteristics of the terrain, the starting probabilities are improved by taking into consideration the characteristics of the terrain. In a sub-step 212 of the improvement in the area surrounding the position of the vehicle, the probabilities are improved by taking into consideration the physically possible movements of the vehicle. A step 214 of increasing the probabilities around the entry point into the off-road area may optionally be carried out. In a step 216, the probabilities are updated on changing of the position.

Step 130 of ascertaining also has a plurality of sub-steps. In a sub-step 218 of determining, a result is ascertained for probabilities of reaching the cells at the edges. In a sub-step 220 of selecting, the most probable exit point is determined. As an alternative to this, a normalized probability picture may be determined in a sub-step 222.

During a trip, it is possible that the driver will leave the network of roads with his vehicle. Most navigation devices, however, are designed to be able to guide the driver to a destination on the roads provided for the purpose and stored in the digital map. Owing to that design, the system attempts to assign the position of the driver to a position on the road by the so-called matching method. Even upon departure from the road, the system attempts to keep the position on the road. Only when a certain limit is exceeded is the assumption rejected that the driver is still on the road with his vehicle. The position is therefore no longer matched. Instead, the system shows the ascertained position on an off-road area. Normally, after a certain time, the driver reaches the road network again and continues to move along it. At that new transition process, the navigation system requires a time for adaptation in order to find its position on the road and once again fulfill its actual function, that of guiding the driver. The method presented herein improves that approach in that it enables the system to calculate possible and probable exit points from the off-road area in advance and thus to be able to orient itself more quickly when the driver leaves the off-road area. The method utilizes the information provided to it to calculate at what point the driver will, with the greatest probability, leave the off-road area again with his vehicle. In that operation, starting from an initialization, the transition probabilities are successively improved with each item of information.

In the description that follows, an exemplary embodiment of the present invention is described again in more detail with reference to the flow diagram of FIG. 2. The method is initialized (step 200) when the current position is classified as off-road. For this, the edges of the roads forming the boundary of the off-road area in which the driver is situated with his vehicle are determined in the first step (step 202). If that land area is too large or if, owing to topographical peculiarities, such as sea, it is not bounded exclusively by roads, the size of the land area is limited to a certain size, for example a square kilometer.

If the driver reaches such an artificially generated edge while traveling with his vehicle in the off-road area, the method is initialized again with a new land area. That procedure makes it possible to limit the complexity in order to prevent an excessively long calculation time. A grid that encompasses the boundary roads is then placed over that land area (step 204). The description relates to a rectangular grid, but other grids may also be used. Each field of the grid serves as a state for a discrete Markov process. To implement such a Markov chain, transition probabilities of changing to another state or remaining in it from one point in time to the other are required (step 206). The sum of the probabilities should by default be 1. These are then used to calculate an entire chain. The cells at the edge are given the probability 1 that the Markov chain will remain in that state. The probabilities that a jump will be made to a different cell are set at 0. Accordingly, those cells represent what is referred to as a stationary state in which the chain remains.

In the remainder of the cells, the probability that the state in the cell will remain is set at 0. The probability that a jump will be made to an adjacent cell is initialized with equal distribution. In a rectangular grid in which diagonal jumps are permitted, there is therefore a probability of ⅛ of jumping into an adjacent cell. Thus, the initial transition probabilities are given for all cells.

In the following, those probabilities are further improved with the aid of the available items of information. In the first improvement step (step 208), the characteristics of the roads, for example, stored in the digital map are examined to ascertain how probable it is for them to be reached from an off-road area. For example, the probability of reaching higher-class roads, such as, for example, expressways, is distinctly lower than that of reaching lower-class roads, such as, for example, dirt roads. The latter are usually only insufficiently digitized or lead directly to an off-road area. Therefore, the probability of leaving the off-road area on such a road is distinctly higher.

By that step, the transition probabilities of the cells adjacent to the outer cells are adapted. The transition probabilities in relation to all outer cells are increased or reduced and, in relation to the other cells lying further inward, are also uniformly increased or reduced accordingly. There is also no changing of the probability of outer cells that are not part of a boundary road and that are part of an artificially generated land area boundary. In the further course of the method, they are regarded, for example, as lying on an imaginary road. Only upon evaluation are they treated in differentiated form.

In the second possible improvement step (step 210), items of information about the topography of the off-road area, if available, are used to adapt the transition probabilities of the cells within the land area. If the land area contains absolutely impassable places, such as, for example, lakes, then the transition probabilities of jumping to the corresponding cells is set at 0. Similarly, differences in level are used to distinctly reduce the probabilities of transition from such cells and to correspondingly increase those with little difference in level. What is decisive for this change is for the routes that are easier to drive to be provided with higher probabilities.

The third possible improvement (step 212) concerns the cells in the immediate surroundings of the current position. In this case, the probabilities are adapted according to the physical realities of how the vehicle is able to move. Jumps from one cell to another that are possible only with unnatural steering movements are given very low probabilities whereas the transition probabilities to cells that may be reached by the vehicle by moving straight on and by slight steering movements are given a higher rating. This step increases the complexity of the method, since the transition probabilities are no longer rigid but change in every step owing to the changed position and the direction of travel; however, this local adaptation has a great impact on the probabilities of reaching a final state. It is precisely upon approaching the edge that an exit point becomes apparent more quickly in that manner.

Optionally, in a fourth step (step 214), the probabilities around the entry point into the off-road area may be increased. This makes the assumption that the driver intends to stay in the off-road area only briefly and to leave it again at the same place. Increasing the probability of crossing the corresponding transition contributes to this. As long as the driver is in those immediate surroundings of the corresponding cell, the orientation toward the entry point is given. The more the driver moves away from the entry point, the less influence that increase will have, which corresponds to the assumption that the driver is aiming for a different exit point. Once all the transition probabilities have been given, it is possible to calculate for all outer cells the probabilities of reaching them from the current position with the aid of a Markov chain (step 218). That calculation is done, for example, using conventional mathematical methods. Similarly, it is possible to determine in that manner the cell that has the highest probability of being reached (step 220). That cell is assumed at that point in time to be the most probable exit point from the off-road area. At that place, it is possible to make a differentiation if a cell lying on an imaginary road is involved. Thus, either it may be concluded that the driver does not intend to leave the off-road area for the time being, or the outer cell on a real road with the highest probability of being reached is sought. Alternatively, it is also possible to normalize the probabilities of being reached for all outer cells in order to obtain in that manner a general probability picture of all the exit points (step 222). In this case also, all the outer cells or only those on a real road may be taken into consideration.

It should be noted here that calculation of the probabilities of reaching an outer cell is possible at any time on the basis of the initialization, even without additional information. In that case, the method corresponds to a shortest-route method, which calculates the exit point that is at the least distance from the current position.

If the position of the vehicle changes at the next position measurement, so that the driver is in a different cell, which represents in this case the next time step, then the method may be resumed (step 216), for example, in the third improvement step (step 212). Here, the transition probabilities in the area surrounding the cell in which the vehicle is currently situated are adapted anew. Cells that are now no longer in the immediate surroundings are given the original transition probabilities without taking the model of vehicle into consideration. Those cells that are in the area surrounding the vehicle are adapted according to the model of the vehicle (for example in respect of maximum possible degree of lock and hence in respect of reachability of those cells).

The previously calculated probabilities may be stored in a memory so that they may be re-used in the event that the cell drops out of the area surrounding the vehicle again. Thereafter, the method is resumed as described above and new probabilities are calculated. To simplify the new calculation, certain sub-chains relating to the outer cells may be stored. If those are not affected by the adaptation in the area surrounding the current position of the vehicle, they continue to retain their validity. The more sub-chains stored, the faster the method will be, but the more storage space will be used.

Figure 3:
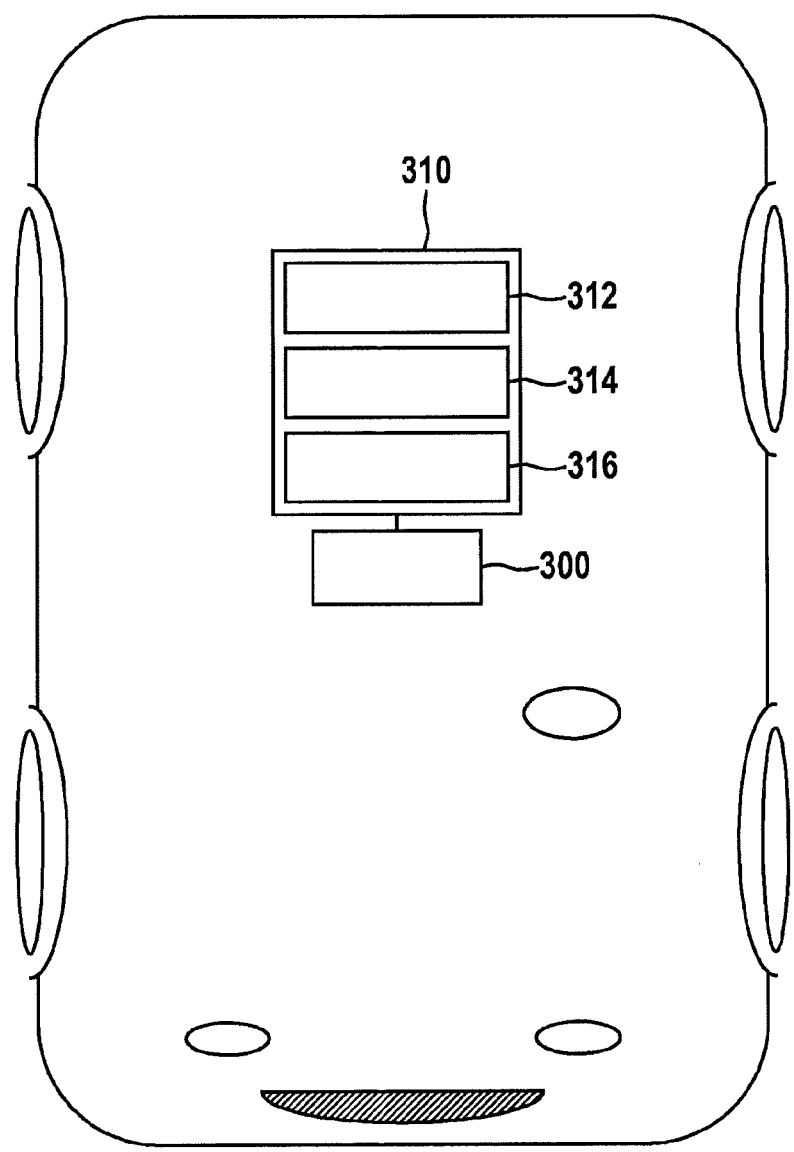
FIG. 3 shows a block diagram of an exemplary embodiment of the present invention.

FIG. 3 shows a block diagram of an exemplary embodiment of the present invention. A vehicle has a navigation system 300 and is situated at a position. Connected to navigation system 300 is an apparatus 310 for ascertaining at least one exit probability from a land area identifiable in a digital map as open terrain. Apparatus 310 has a device 312 for subdividing the land area into a plurality of cells. In device 312, an initial transition probability is assigned to at least one transition from one cell to an adjacent cell. The transition is situated between the position of the vehicle and an edge of the land area. Apparatus 310 further has a device 314 for adapting the initial transition probability of the transition. In device 314, the initial transition probability is adapted when at least one item of information from the digital map is available. The item of information is associated with the cell or with the adjacent cell. Device 314 outputs an adapted transition probability for the transition. In a device 316 for ascertaining the exit probability, the exit probability is ascertained at least with the use of the adapted transition probability. Using the exit probability, navigation system 300 is already able to begin route guidance before the vehicle reaches the edge of the land area.

Figure 4:
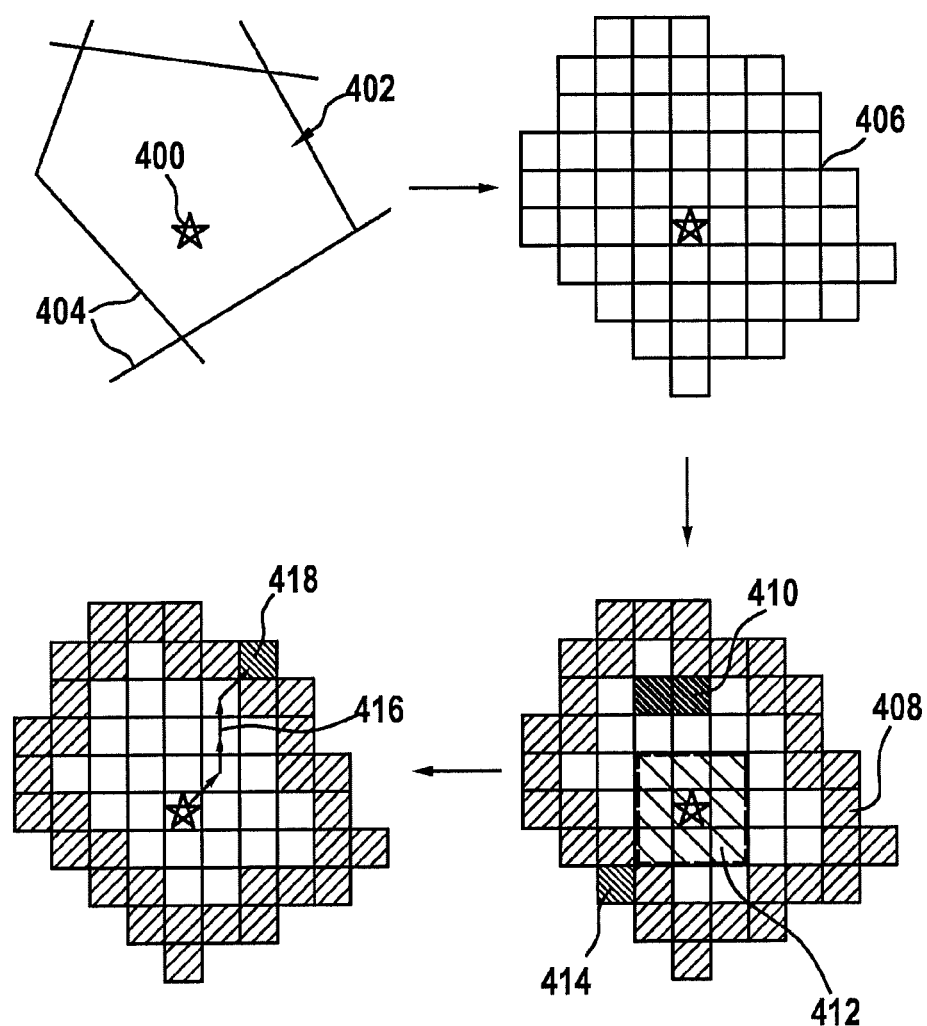
FIG. 4 shows a diagram to illustrate the procedure in the determination of an exit probability in accordance with an exemplary embodiment of the present invention.

FIG. 4 shows a procedure or results for how a method for calculating the most probable point of exit from an off-road area might take place in accordance with an exemplary embodiment of the present invention. A vehicle is situated at a position 400 within a land area 402. Land area 402 is identifiable in a digital map as open terrain. Land area 402 is surrounded by boundaries 404. For example, boundaries 404 are traffic routes, bodies of water, buildings or impassable terrain. Land area 402 is covered by a grid 406, producing individual cells in that grid. In this exemplary embodiment, grid 406 is a rectangular grid. Every transition from one cell of grid 406 to an adjacent cell is assigned a respective initial transition probability.

Then, the initial transition probabilities are adapted. To do this, the initial transition probabilities are adapted in cells 408 of grid 406. At the edge of land area 402, the adaptation takes place, for example, in response to a class of traffic route contained in the cell or a difficulty of terrain of the body of water, country or built-up area contained in the cell. Away from the edge, the adaptation takes place according to the difficulty of terrain of the body of water, country or built-up area contained in the cell. If cells 410 are unreachable, then those cells and transitions to those cells are assigned low adapted transition probabilities representing the fact that it is improbable for those cells to be reached from surrounding adjacent cells.

Cells 412 in the area surrounding a vehicle at position 400 are given adapted transition probabilities that are based upon an orientation and speed of the vehicle at position 400. A distance from an entry cell 414 of the vehicle into the open terrain affects transition probabilities between cells in the surrounding area in such a manner that, up to a certain distance of the position from entry cell 414 in the open terrain, reaching entry cell 414 again is more probable than not reaching it. From position 400 an exit path 416, for example, is determined. Exit path 416 has, based on the initial transition probabilities and adapted transition probabilities, an exit probability of reaching a particular cell on the edge of the land area. An exit path accordingly runs through a plurality of cells of the open terrain subdivided by the grid. By comparing, for example, the sum of the transition probabilities of the individual cells of a plurality of different exit paths leading to different exit cells on the edge of the land area it is therefore possible to determine an exit path that has the greatest total exit probability. That exit path describes the instantaneous most probable path that will be taken by the vehicle from position 400. That exit path 416 then leads to a cell at the edge which is the most probable exit cell 418. On the basis of exit cell 418, the navigation system in the vehicle is already able to prepare a road-routed navigation procedure or initiate that navigation procedure before the vehicle reaches exit cell 418, so that there is no delay when the vehicle leaves the open terrain again at that exit cell.

Figure 5:
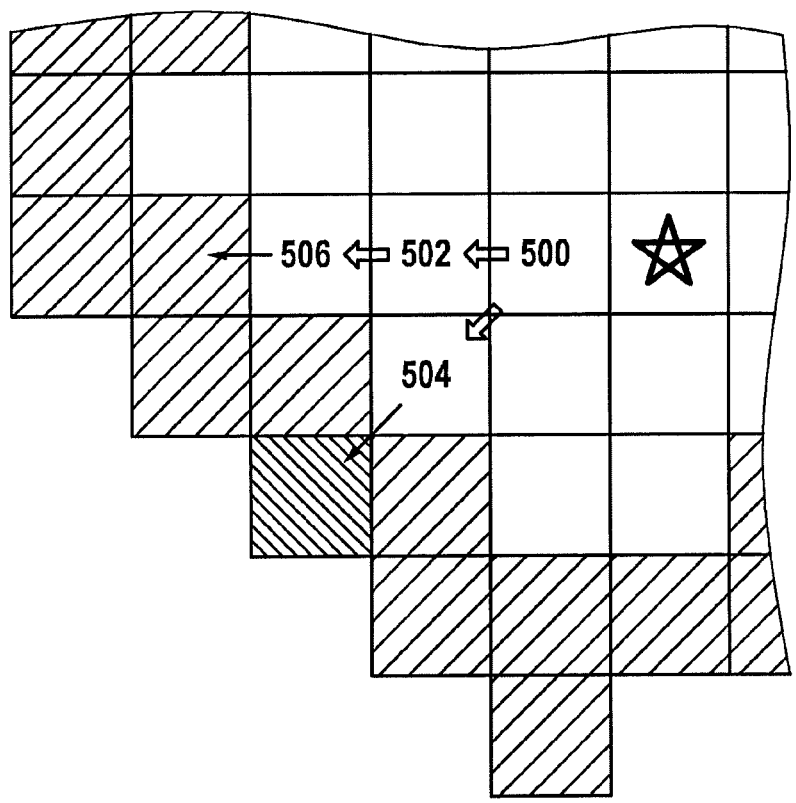
FIG. 5 shows a detailed diagram to illustrate the procedure in the determination of an exit probability in accordance with an exemplary embodiment of the present invention.

FIG. 5 shows a procedure for determining a most probable exit cell in accordance with one exemplary embodiment of the present invention. Between a position and an edge of the land area, there is a plurality of cells. At least one of the transitions between the cells, in this case between cell 500 and adjacent cell 502, is assigned an initial transition probability. The initial transition probability is adapted in response to a presence of an item of information from a digital map in order to obtain an adapted transition probability from cell 500 to adjacent cell 502. The item of information from the digital map relates either to cell 500 or to adjacent cell 502. For example, the item of information may be a reference to the fact that cell 502 contains a lake or pond through which it is not possible to drive. Using the adapted transition probability, an exit probability of a vehicle in cell 500 to a cell at the edge of the land area is ascertained.

A further transition, in this case between cell 500 and a further cell 504, is assigned a further initial transition probability. If further items of information from the digital map either in relation to cell 500 or in relation to further cell 504 are available, the further initial transition probability is adapted accordingly. In that manner, a further adapted transition probability between cell 500 and further cell 504 is obtained. A further exit probability between the position and a further cell 504 at the edge is ascertained with the use of the further adapted transition probability between cell 500 and further cell 504. Further cell 504 at the edge may be a cell that lies on the edge.

If the exit probability is higher than the further exit probability, an exit path that contains the transition probability is ascertained. If the further exit probability is higher than the exit probability, a different exit path, containing the further transition probability from cell 500 to further cell 504, is ascertained. The exit path is then determined with reference to a sequence of transitions from adjacent cells, with the transition between cell 500 and subsequent cell 506 being referred to as a subsequent transition for differentiation of the individual transitions. The subsequent transition between adjacent cell 502 and a subsequent cell 506 is then also assigned a subsequent initial transition probability. The subsequent initial transition probability is adapted in response to a presence of a subsequent item of information from the digital map relating to adjacent cell 502 and/or to subsequent cell 506. That produces an adapted subsequent transition probability between adjacent cell 502 and subsequent cell 506.

What is claimed is:

1. A method for ascertaining at least one exit probability from a land area identifiable in a digital map as open terrain, starting from a position within the land area, the method comprising:

subdividing the land area into a plurality of cells, with an initial transition probability being assigned to at least one transition from one of the cells to an adjacent one of the cells, the transition being situated between the position and an edge of the land area;

adapting the initial transition probability of the transition, in response to a presence of at least one item of information from the digital map to obtain an adapted transition probability for the transition, the item of information being associated with one of the cells or with the adjacent cell, wherein, in the adapting, the initial transition probability is adapted using a distance of a transition from an entry point of the vehicle into the open terrain so that the initial transition probability is adapted to a higher probability in dependence on the distance of the transition; and ascertaining the exit probability, the exit probability being ascertained using the adapted transition probability, wherein the method is performed by a car navigation system.

2. The method as recited in claim 1, wherein in the subdividing, at least one of:
the subdividing is carried out in such a way that a plurality of transitions form a network, the network encompassing the land area, and
the cells are restricted to a previously determined maximum surface area of the land area.

3. The method as recited in claim 1, wherein in the adapting, the initial transition probability is adapted using a class of a traffic route, when the cell includes at least the traffic route and when the digital map contains items of information about the traffic route and the class.

4. The method as recited in claim 1, wherein in the adapting, the initial transition probability is adapted using at least one terrain characteristic of the one of the cells or the adjacent cell when the digital map contains items of information about the terrain characteristics.

5. The method as recited in claim 1, wherein, in the adapting, the initial transition probability is adapted using at least one of a direction of movement, and a speed of a vehicle.

6. The method as recited in claim 1, wherein:
in subdividing, a further initial transition probability is assigned to at least one further transition from the cell into a further adjacent cell, the further transition being situated between the position and an edge of the land area;
in the adapting, the further initial transition probability of the further transition, the further initial transition probability is adapted in response to a presence of at least one further item of information from the digital map to obtain a further adapted transition probability for the further transition, the further item of information being associated with one of the cell or the further adjacent cell; and
in ascertaining, a further exit probability is ascertained, the further exit probability being ascertained at least with the use of the further adapted transition probability of the further transition.

7. The method as recited in claim 6, wherein, in the ascertaining, an exit path from the land area is ascertained, the exit path containing the transition between the cell and the adjacent cell when the exit probability is higher than the further exit probability.

8. The method as recited in claim 1, wherein:
in the subdividing, a subsequent initial transition probability is assigned to at least one subsequent transition from the adjacent cell into an adjacent subsequent cell, the subsequent transition being situated between the position and an edge of the land area;
in the adapting, the subsequent initial transition probability of the subsequent transition, the subsequent initial transition probability is adapted in response to a presence of at least one subsequent item of information from the digital map to obtain an adapted subsequent transition probability for the subsequent transition, the subsequent item of information being associated with one of the adjacent cell or the subsequent cell; and
in the ascertaining, the exit probability is ascertained with the use of the adapted subsequent transition probability of the subsequent transition.

9. An apparatus for ascertaining at least one exit probability from a land area identifiable in a digital map as open terrain, starting from a position within the land area, the apparatus comprising:
a device to subdivide the land area into a plurality of cells, an initial transition probability being assigned to at least one transition from one cell to an adjacent cell, the transition being situated between the position and an edge of the land area;
a device to adapt the initial transition probability of the transition in response to a presence of at least one item of information from the digital map to obtain an adapted transition probability for the transition, the item of information being associated with the cell or with the adjacent cell, wherein, in the adapting, the initial transition probability is adapted using a distance of a transition from an entry point of the vehicle into the open terrain so that the initial transition probability is adapted to a higher probability in dependence on the distance of the transition; and
a device to ascertain the exit probability, the exit probability being ascertained at least with the use of the adapted transition probability of the transition, wherein the apparatus is included in a car navigation system.

10. A non-transitory computer readable storage medium storing program code, the program code to ascertain at least one exit probability from a land area identifiable in a digital map as open terrain, starting from a position within the land area, the program code, when executed by a processor, causing the processor to perform the steps of:
subdividing the land area into a plurality of cells, with an initial transition probability being assigned to at least one transition from one of the cells to an adjacent one of the cells, the transition being situated between the position and an edge of the land area;
adapting the initial transition probability of the transition, in response to a presence of at least one item of information from the digital map to obtain an adapted transition probability for the transition, the item of information being associated with one of the cells or with the adjacent cell, wherein, in the adapting, the initial transition probability is adapted using a distance of a transition from an entry point of the vehicle into the open terrain so that the initial transition probability is adapted to a higher probability in dependence on the distance of the transition; and
ascertaining the exit probability, the exit probability being ascertained using the adapted transition probability, wherein the method is performed by a car navigation system.

* * * * *